United States Patent Office 2,986,518
Patented May 30, 1961

2,986,518

GREASE-MAKING PROCESS

William D. Carswell, Chester, and Peter Willcock, Liscard, Wallasey, England, assignors to Shell Oil Company, a corporation of Delaware No Drawing. Filed May 19, 1959, Ser. No. 814,148

Claims priority, application Great Britain May 27, 1958

6 Claims. (Cl. 252—28)

This invention relates to the production of thickened lubricating oil compositions, especially lubricating greases. More particularly, it relates to a process in which such compositions are thickened by means of an inorganic gel material in the form of an organogel, i.e. one in which water has been displaced from a hydrogel of the gel material by a volatile organic liquid such as an alcohol which, unlike the water of the hydrogel, is soluble in the lubricating oil employed.

Greases which are gelled with inorganic colloid, such as silica, have been developed in the past few years. One of the principal problems in the preparation of such greases comprises the formation of an optimum gel structure. According to previously known processes, an organogel such as an alcogel was mixed with lubricating oil in a kettle and the gel substrate was then removed by heating and stirring. Greases formed by this means lacked optimum storage stability and thermal stability. Moreover, the gels so formed did not provide their maximum thickening power, thus necessitating the use of larger than desired proportions of the colloids to create a grease of a given consistency.

It is an object of this invention to provide an improved process for the preparation of oils and greases containing inorganic colloidal gels. It is another object of the invention to provide a process for the production of greases having improved yields, better storage stability and higher thermal stability. Other objects will be evident from the detailed description of the invention.

Now, according to the present invention, thickened lubricating oils and lubricating greases are prepared by a process which comprises gradually adding an organogel of an inorganic colloid in a volatile organic liquid to a hot lubricating oil and maintaining said oil at elevated temperature during the addition so that at least 85% by weight of the organic liquid evaporates as the gel is added, the liquid substrate of the organogel never exceeding about 5% by weight of the lubricating oil during its evaporation. If necessary, the elevated temperature can be maintained after the addition, to complete the removal by distillation of the organic liquid. Further, vacuum or sub-atmospheric pressures may be employed during the distillation for this purpose. It is generally desirable to mill the resulting product to produce a grease structure.

By adding the organogel to the heated oil, instead of adding the oil to the organogel after or in the course of evaporating the organic liquid from the organogel, it is found possible to produce greases of more uniform structure and of greater storage and heat stability and/or to employ lower proportions of inorganic gel material while still achieving a stable product. It appears likely that heating of the organogel in bulk in the presence of gradually increasing quantities of oil, as has hitherto seemed necessary in principle as providing the greatest concentration of organic liquid and so facilitating its rapid removal, results in practice in unduly prolonged heating of the gel material, tending to give rise in time to an undesirable degree of compaction or collapse of the fine pore structure of the inorganic gel aggregates. The process of the present invention, on the other hand, by giving rise to very rapid evaporation of the liquid from the organogel as it is fed to the hot lubricating oil, such evaporation taking place in the presence of an ample supply of oil to replace the volatile liquid displaced by evaporation, minimizes this tendency and causes the fine pore structure of the gel material to be retained and carried forward into the oleogel stage.

The process of the present invention may be carried out with a wide variety of ingredients. The lubricating oils to be used are substantially water immiscible materials and may be of synthetic or natural origin or mixtures thereof. The preferred type of lubricating oil is one having a viscosity of at least that of an SAE-5 lubricating oil, but for higher temperature purposes heavier oils are desirable. A particularly suitable type of lubricating oil for use in high temperature greases is that known as "bright stock." Other lubricating oils that may be used, either as the sole lubricating oil or in admixture with a mineral lubricating oil or with one another are esters of aliphatic dicarboxylic acids wherein the alcohol radical contains an aliphatic hydrocarbon chain having between 4 and 12 carbon atoms and the dicarboxylic acid radical contains from 6–12 carbon atoms. Suitable examples of such esters are bis(iso-octyl)sebacate, bis(iso-octyl)adipate and bis(2-ethyl hexyl)sebacate. Polymeric oxyalkylene compounds, e.g. polypropylene oxide and its copolymers with ethylene oxide, and polymers of glycols, e.g. polymers of trimethylene glycol, are also suitable. A further important class of suitable oils are the high-boiling liquid organic polymers containing silicon, e.g. the liquid polymethylphenyl siloxanes and polymethyl siloxanes, and mixtures and copolymers thereof.

Inorganic gel materials suitable for use in this invention must be capable of preparation in organogel form, preferably as alcogels. Amorphous inorganic colloids are generally suitable, including various metallic oxides, hydroxides, sulfides, silicates, sulfates and carbonates or mixtures of such substances. Silica is especially useful because of its low cost and ready availability. Alkaline earth metal hydroxides are also useful, especially when mixed with silica. The organogel used as a starting material in the present invention should contain between about 0.5 and 10% by weight of the inorganic gel material, preferably from 1 to 5%. Using silica as a specific example, an alcogel thereof in isopropyl alcohol can be prepared by slowly adding a solution of sodium silicate (30% $SiO_2$) in about an equal weight of water, or a little less, to a stirred solution of 3½% sulfuric acid until the pH rises to 6.2 as determined by test papers. When the addition is complete, the stirring is stopped and the hydrogel is allowed to form, at which stage it contains appreciable amounts of sodium sulfate. After aging, the gel is broken up and mixed with three times its volume of water, stirred and allowed to settle, and the excess water is decanted. This is repeated several times to eliminate the sodium sulfate. Washing is then continued, first with wet isopropyl alcohol and then with anhydrous isopropyl alcohol until the top clear layer contains less than 2% of water. Alternatively, filtration methods may be resorted to for the removal of the sodium sulfate, or the salt may be removed by contacting the hydrogel with ion exchange resins.

The volatile organic liquid used in the preparation of the organogel is preferably an alcohol (e.g. isopropyl alcohol as indicated above) and is, in any case, water-miscible. While organogels in water-immiscible liquids, particularly volatile hydrocarbons, can be used in the actual process of incorporating the inorganic gel material in the lubricating oil, they can only be prepared in the first instance from the original hydrogel by two or more stages of displacement, using at each stage a liquid miscible with the liquid in which the gel of the previous stage is formed. Such a multi-stage preparation constitutes an unnecessary expense since when a water-miscible organic liquid is employed, the organogel can be prepared in a single stage. Examples of organic liquids suitable for the purpose are alcohols, as mentioned above, e.g., ethyl alcohol, the propyl alcohols, diacetone alcohol, cyclohexanol and methyl cyclohexanol; ketones, e.g. acetone, di-ethyl ketone and methyl ethyl ketone; ethers, e.g. isopropyl ether and dioxane; esters, e.g. methyl and ethyl acetate; diols, e.g. propylene, butylene and hexylene glycols; diglycols, e.g. dipropylene and dibutylene glycols; glycol monoalkyl ethers, e.g. the mono-methyl, -ethyl, -propyl and -butyl ethers of ethylene or propylene glycol; glycerine mono- or di-alkyl ethers, e.g. mono- or di-propyl glycerine; and amines and heterocyclic bases, e.g. the alkanolamines, pyridine and morpholine. Mixtures of such liquids may also be employed.

While lubricating greases can be made comprising simply a lubricating oil and an inorganic colloid it is well known that such greases tend to break down in the presence of water. It is therefore general practice to incorporate in inorganic gel greases a surface active agent to protect the grease from the deleterious action of water. In the process of the present invention it is therefore preferred to incorporate a surface active agent when mixing the alcogel and hot lubricating oil, or to the alcogel before such mixing. Other ingredients may also be added in this way, e.g. an anti-oxidant, such as phenyl alpha- or beta-naphthylamine, preferably added to the oil before mixing.

Surface-active agents used in the process of the present invention may be cationic, anionic, or non-ionic in character. Preferably they are cationic materials. Generally, in order that it may be sufficiently oil-soluble, the surface-active agent should contain at least 12 carbon atoms per molecule and preferably should contain at least one hydrocarbon radical per molecule having at least 12 carbon atoms. Suitable cationic materials include the "onium" compounds such as ammonium, phosphonium, sulfonium and arsonium compounds. The ammonium compounds include salts of aliphatic, alicyclic, aromatic and heterocyclic amines including primary, secondary and tertiary amines and polyamines, as well as quaternary ammonium compounds. Other suitable ammonium salts are those of inorganic acids, such as octadecyl heptadecyl ammonium bromide or tridodecyl ammonium chloride, and those of organic acids, such as heptadecyl ammonium acetate. Illustrative examples of other classes of suitable onium compounds are triphenyl alkyl phosphonium or stibonium halides and dialkyl or diaryl phosphonium or sulphonium halides.

Other suitable cationic materials are the aliphatic long-chain amines having 12 or more carbon atoms, e.g. octadecylamine, and the long-chain polyamines. Amido-amines, e.g. the monoamides of diethylene triamine and triethylene tetramine, are particularly effective. Complex substances may be employed, e.g. the partial amides formed from fatty acids containing 7 or more carbon atoms in the molecule or rosin acids with aliphatic poly-amino-hydroxy compounds, e.g. the condensation products of halohydrins, such as epichlorohydrin, with ammonia or a primary or secondary amine. Preferred products are the condensation products of epichlorohydrin and ammonia, converted to partial amides having between ¼ and ¾ of their amino groups in the amide form, by reaction with fatty acids containing 7 or more carbon atoms in the molecule or rosin acids, e.g. stearic acid or the acids derived from tall oil or the animal or vegetable fats and oils. Similar useful products may be obtained by condensation of acrolein and ammonia followed by partial amide formation.

In addition to the cationic surface-active agents, anionic materials may be employed, e.g. fatty acids and hydroxy-substituted fatty acids having at least 12, and preferably, at least 16 carbon atoms per molecule, e.g. stearic acid and its homologs and 12-hydroxystearic acid. The acids may be used as such or in the form of their soaps, preferably polyvalent metal soaps and, still more preferably, amphoteric metal soaps. Preferred soaps are aluminum 12-hydroxystearate, lead 12-hydroxystearate and calcium naphthenate.

Another method of improving the water resistance of the grease, and one particularly applicable when an anhydrous or benzogel is used, consists in coating the particles of the gel material with an esterifying or polymerizable silicon compound. Suitable polymerizable or esterifying silicon compounds for this purpose are the alkylhalo silanes e.g. the mono-, di- or tri-methyl or -ethyl tri-, di- or mono-chloro silanes. Particularly suitable are the alkylalkoxy silanes e.g. the mono, di- or tri-methyl or -ethyl tri, di- or mono-methoxy or -ethoxy silanes. The alkoxy amino silanes such as di-tertiary butoxy amino silane can also be had. Preferably the polymerization of the silicon compound, where such takes place, is carried out in the presence of the gel material, for instance by adding the polymerizable silicon compound to an organogel and refluxing the mixture until polymerization is complete. The hydrogel halide or alkanol evolved in the course of polymerization is removed, for instance by distillation.

In other cases also, if the surface-active agent is added to the organogel before the latter is mixed with the lubricating oil, it is useful to heat the organogel and surface-active agent together at a temperature above 60° C. for a period of at least 30 minutes. This results in an organogel wherein the surface-active agent is evenly distributed on the surface of the gel particles.

In order to provide the finished lubricating grease with a satisfactory resistance to water, the surface-active agent should generally be present in an amount of between 15% and 400% by weight of the inorganic gel material. The proportion of surface-active agent employed is dependent upon the particular gel material employed, the particular surface-active agent employed, and the degree of water resistance required. Generally the degree of resistance required to give a suitable grease is such as to give a water absorption, on stirring the grease manually with successive quantities of water and noting when water absorption is replaced by water repellence, of the order of less than 75% of the weight of the grease. The process of waterproofing should not be carried too far, since an excessive amount of waterproofing agent tends to inhibit the formation of the required grease structure. It has been found, however, that greases required to be stable under the influence of neutron radiation, as is necessary for a grease to be used in atomic piles and nuclear power units, needs to be waterproofed to a higher degree than is necessary for the production of a stable grease for use in normal circumstances. Waterproofing to a degree of water absorption from 40 down to 10% has been found desirable for this particular purpose. In general, the quantity of waterproofing agent necessary will be be-between 50 and 250% of the weight of the gel material.

The mixing of the organogel with the hot oil takes place in a suitable distillation apparatus, provided with means for the application of heat, for adequate stirring of the highly viscous or plastic semi-solid product, for maintaining the desired pressure or vacuum, for the introduction of the components, and for the removal and condensation of the organic vapors. Ordinary distillation stills including water condensers can be adapted for the purpose. A suitable form of still comprises an oil-jacketed closed kettle provided with variable speed counterrotating stirrers equipped with scrapers, and an oil heated open kettle. A system of pipes and pumps permits the charge to be recirculated round each kettle and to be transferred from one kettle to the other. The closed kettle is furnished with a suitable distillation head while the open kettle serves as a hopper for receiving the organogel and any other materials to be added in the course of mixing, and for admitting them at a controlled rate to the closed kettle.

In adding the organogel it is desirable to control the rate of addition, both to prevent excessive frothing, and to enable the desired temperature of the oil to be maintained at a suitable excess, say 20–60° or more, over the boiling point of the organic liquid to be distilled off. Subject to this precaution, and to the use of temperatures well below the boiling point of the oil employed, it is preferable to work at as high an applied temperature (i.e. the jacket temperature of the distillation unit) as possible, the choice of applied temperature being a matter of balance between excessive frothing at too high an actual oil temperature, and an uneconomically low distillation rate at too low an oil temperature, either of which reduces the permissible rate of addition of organogel. The optimum temperature will depend largely on the capacity and design of the apparatus available. The distillation is continued until all of the volatile organic liquid has been removed, or it may be stopped when the content of such liquid is at a suitable low figure.

The proportion of gel material added to the lubricating oil component may range from about 1 to about 20% of the weight of the oil component and preferably, in the case of lubricating greases, from 3 to 10%. While the chief importance of the present invention lies in its application to the production of lubricating greases, it is also applicable to the production of lubricating oil compositions, thickened, but not gelled, with inorganic colloids, for which purpose lower proportions of inorganic gel material will be employed. On the other hand the invention also includes the preparation of grease concentrates containing, for example, 8% or more of inorganic gel material which are stored and subsequently diluted as required with additional lubricating oil component, and remilled to grease consistency.

Following the distillation, it is generally necessary to subject the solvent-free composition to a milling or shearing action in order to get a satisfactory lubricating grease structure. The mixture left as a residue from the distillation is generally in the form of a slurry having the consistency of a heavy oil. This may be subjected to shearing action by forcing it through small passages under high pressure. Such passages preferably have diameters of 0.01 to 0.025 inch and are 3 to 12 inches long while the pressure is generally 5000 to 12,000 p.s.i. However, an alternative piece of equipment, which may be employed, is a homogenizer such as that available on the market bearing the trade name "Manton-Gaulin" homogenizer. The use of the latter type of apparatus, in which the small passages are provided by adjustably spring-loaded valves, substantially reduces the amount of recycling necessary to obtain a lubricating grease with the desired penetration. Moreover, the amount of gelling agents required to produce a lubricating grease of a given penetration can be reduced by as much as 15% when using the Manton-Gaulin homogenizer as compared with the orifice-pump method. It is preferable, if practicable, to mill or shear the mixture as it is delivered from the distillation apparatus, at about the final working temperature therein, e.g. 130°–150° C. However, it may be more convenient to draw off and store the mixture, and to mill or shear it as a subsequent operation, preferably at a temperature of 20° to 55° C. In place of the milling or shearing apparatus mentioned above, other homogenizers or paint mills may be utilized.

The following examples illustrate the invention, the parts referred to being by weight.

*Example I*

Into 160 parts of a silica gel in isopropyl alcohol containing 3% $SiO_2$ were thoroughly stirred 1.2 parts of an oil-soluble surface active agent supplied as a 30% dispersion in a hot mixture of equal parts of an isopropyl alcohol and water. The surface active agent is one made by condensing epichlorohydrin with aqueous ammonia and converting the product into a partial amide by reaction with an amount of commercial stearic acid equivalent to one third of its basicity. 52.5 parts of a solvent-refined mineral lubricating oil, of a viscosity of 650 secs. Redwood 1 at 140° F., were heated to 100° C. in a closed kettle provided with an oil jacket maintained at 130° C. and 0.4 part of phenyl-beta-naphthylamine were added as an anti-oxidant. The silica gel was then slowly pumped into the closed kettle, at a rate limited to 0.75 part per minute to enable the temperature of the oil to be maintained. After about four hours the silica gel had been added and the charge was maintained at 120–130° C. for a further two hours to remove the last traces of alcohol. During this period samples were removed and tested for penetration as a result of which 17.5 further parts of oil were added during the period. The charge was run off and passed twice through a Manton-Gaulin homogenizer, using a valve pressure of 4–5000 p.s.i. and a further quantity of oil (5 parts) was added between passes to give the required penetration. The resulting grease was of high quality, having a silica-content of 4.5%, an unworked/worked I.P. penetration of 222/262, an evaporation loss over 22 hours at 150° C. of 1.2%, a water absorption of 65%, a water resistance (measured as "washout" i.e. as proportionate grease loss from a bearing subjected to standard working conditions in the presence of water for one hour) of 2.8% and a drop point in excess of 220° C.

*Example II*

The procedure of Example I was followed, except that the surface-active agent was added as a suspension in hot anhydrous isopropyl alcohol, and the oil jacket was maintained at 150°–160° C., enabling the rate at which the alcogel was added to be increased to about 1 part per minute. The resulting grease had a silica content of 4.4%, an I.P. penetration of 271/300, an evaporation loss of 0.5%, a water absorption of 55% and a water washout of 1.1%.

*Example III*

91 parts of a silica gel in isopropyl alcohol containing 3.3% $SiO_2$ together with 0.75 part of the surface-active agent used in Example I were added at the rate of 0.6 part per minute to 56 parts of a blended polymethyl phenyl siloxane of low aromaticity (7–8% phenyl) heated together with 0.3 part of phenyl-alpha-naphthyl-amine to 100° C. in a closed kettle fitted with a suitable distillation head. The oil jacket of the kettle was maintained at 130° C. to 135° C. and the temperature of the charge fell initially to 90° C. and subsequently rose to 120° C. By the time the addition was completed 82 parts (out of 88) of the isopropyl alcohol added had already been distilled off. The oil jacket temperature was increased to 170° C. bringing the charge to 140° C. at which temperature it was maintained for one hour to remove the remaining alcohol. In the course of the latter period a proportion of the charge was recirculated through a Manton-Gaulin homogenizer, using a valve pressure of 4–5000 p.s.i. and returned to the kettle except for a sample drawn off for penetration test. The whole charge was then filled off through the homogenizer. The resultant grease was of excellent quality having a worked penetration of 254, a silica content of 4.8, an evaporation loss after 22 hours at 150° C. of 1.3% and a water washout of 2.1%. The penetration was re-estimated after storing for 18 days, and showed no change of consistency.

*Example IV*

64 parts of dioctyl sebacate were charged into a still and heated to 120° C. with stirring, and 80 parts of the silica gel with its dispersed waterproofant as employed in Example I were added to the still through a hopper at a rate of 3.3 parts every 8 minutes. With the last two additions of alcogel was added 0.35 part of phenyl-beta-naphthylamine dissolved in 2 parts of dioctyl sebacate. The still was maintained at 120° C. until no further isopropyl alcohol distilled off, after which the temperature of the product was raised to 130° C. and vacuum was applied to the still for a further 15 minutes. The alcogel was discharged from the still while hot and was subsequently milled in a Manton-Gaulin homogenizer, using a valve pressure of 5000 p.s.i. The resulting grease was of high quality having a silica content of 3.85%, an I.P. penetration (worked) of 262, an evaporation loss of 1.8%, a drop point of over 220° C. and a water washout expressed as grease loss of 1.3%.

*Example V*

20 parts of a silica gel in isopropyl alcohol containing 3% $SiO_2$ were mixed with 4 times their volume of a special boiling point spirit (boiling range 65–95° C.) and the mixture stirred for one hour. After settling, the supernatant liquid was siphoned off. This procedure was repeated 4 times whereby the quantity of isopropyl alcohol in the gel was reduced to below 1% by weight. The resulting "benzogel" was waterproofed by refluxing with 0.66 part of dimethyl diethoxy silane until 98% of the silane had been consumed. 9 parts of an acid refined mineral lubricating oil having a viscosity of 140 secs. Redwood 1 at 140° F. were heated in a closed kettle to 130° C. and the proofed "benzogel" was slowly added. When the addition was complete and the volatile hydrocarbon had been stripped off, the product was milled to a grease consistency. The product had a solids content of 7.5% an I.P. penetration (worked) of the order of 260 and a water absorption of 10%, and was extremely stable to neutron irradiation.

We claim as our invention:

1. A process for the preparation of a lubricating grease composition which comprises adding an organogel of an inorganic colloid to a lubricating oil, said organogel comprising a water-miscible organic solvent volatilizing below the boiling range of the oil and 0.5–10 percent by weight of grease-forming inorganic amorphous colloids, the temperature of the mixture being at least 20° C. above the boiling point of the oil-miscible substrate of the organogel and below the minimum boiling point of the lubricating oil, the amount of liquid substrate present in the oil at any time not exceeding 5% by weight of the oil, whereby substantially instantaneous volatilization of at least about 85% by weight of the substrate occurs and a suspension of the colloid in oil is formed, the proportion of inorganic colloid in the grease being 3–10 percent by weight.

2. A process according to claim 1 wherein the colloid consists essentially of silica and the substrate comprises a water-soluble alcohol.

3. A process according to claim 1 wherein the suspension is subjected to shearing, whereby a grease structure is formed.

4. A process according to claim 1 wherein the temperature of the mixture is 20–60° C. higher than the boiling point of the substrate.

5. A process according to claim 1 wherein the substrate is isopropyl alcohol and the inorganic colloid is silica, the silica bearing a water-proofing coating of a polymer of dialkyl dialkoxy silane.

6. A process according to claim 5 wherein the silane is dimethyl diethoxy silane and the polymerization product comprises 50–250% by weight based on the weight of silica.

References Cited in the file of this patent
UNITED STATES PATENTS

| | | |
|---|---|---|
| 2,583,603 | Sirianni et al. | Jan. 29, 1952 |
| 2,583,606 | Sirianni et al. | Jan. 29, 1952 |
| 2,681,314 | Skinner et al. | June 15, 1954 |
| 2,692,863 | Iler | Oct. 26, 1954 |
| 2,748,081 | Peterson et al. | May 29, 1956 |
| 2,820,764 | Hughes et al. | Jan. 21, 1958 |